US 7,450,527 B2

(12) United States Patent
Ashwood Smith

(10) Patent No.: US 7,450,527 B2
(45) Date of Patent: Nov. 11, 2008

(54) METHOD AND APPARATUS FOR IMPLEMENTING MULTIPLE PORTALS INTO AN RBRIDGE NETWORK

(75) Inventor: Peter Ashwood Smith, Hull (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 588 days.

(21) Appl. No.: 11/281,334

(22) Filed: Nov. 17, 2005

(65) Prior Publication Data

US 2006/0109801 A1     May 25, 2006

Related U.S. Application Data

(60) Provisional application No. 60/630,443, filed on Nov. 23, 2004.

(51) Int. Cl.
    *H04L 12/28* (2006.01)
(52) U.S. Cl. .................. 370/255; 370/408; 709/220; 709/241
(58) Field of Classification Search .................. 370/408
    See application file for complete search history.

(56) References Cited

U.S. PATENT DOCUMENTS

| 4,987,536 | A | * | 1/1991 | Humblet | 709/241 |
| 5,251,205 | A | * | 10/1993 | Callon et al. | 370/392 |
| 5,309,437 | A | * | 5/1994 | Perlman et al. | 370/401 |
| 5,570,466 | A | * | 10/1996 | Oechsle | 709/238 |
| 6,098,107 | A | * | 8/2000 | Narvaez-Guarnieri et al. | 709/239 |
| 6,704,320 | B1 | * | 3/2004 | Narvaez et al. | 370/408 |
| 7,398,322 | B1 | * | 7/2008 | Perlman | 709/239 |
| 2003/0043756 | A1 | | 3/2003 | Reynders et al. | |
| 2005/0068903 | A1 | | 3/2005 | Perlman | |

OTHER PUBLICATIONS

R. Perlman, et al., *Rbridges: Transparent Routing*, draft-perlman-rbridge-03.txt, Internet Engineering Task Force (IETF) Internet Draft, May 2005 (18 pages).
R. Perlman, et al., *Rbridges: Transparent Routing*, draft-perlman-rbridge.txt, IETF Internet Draft, Jul. 2004 (20 pages).
R. Perlman, *Rbridges: Transparent Routing*, IEEE INFOCOM 2004 (8 pages).

* cited by examiner

*Primary Examiner*—Wing F Chan
*Assistant Examiner*—Brian Roberts
(74) *Attorney, Agent, or Firm*—Anderson Gorecki & Manaras LLP

(57) ABSTRACT

Shortest-path spanning trees are created outward from each portal on a Rbridge network with nodes on the network being assigned to the spanning trees. For those nodes equidistant to two portals, an election process is used to determine which tree the node should join. To enable routes associated with nodes on the Rbridge network to be distinguished from routes external to the Rbridge network, messages may be transmitted between the portals. The messages enable portals to identify routing updates received from the external network as containing internal routes, so that traffic that is required to pass between nodes on different trees may pass over the Rbridge network rather than over the external network.

20 Claims, 6 Drawing Sheets

802. Spanning Tree

802. Spanning Tree

METHOD AND APPARATUS FOR IMPLEMENTING MULTIPLE PORTALS INTO AN RBRIDGE NETWORK

CROSS REFERENCE TO RELATED APPLICATIONS

This application is related to and claims the benefit of U.S. Provisional Application No. 60/630,443, filed Nov. 23, 2004, entitled "Multiple Portals And Engineered Traffic Flow in RBRIDGED L2 Networks," the content of which is hereby incorporated herein by reference.

BACKGROUND OF THE INVENTION

1. Field of the Invention

The present invention relates to communication networks and, more particularly, to a method and apparatus for implementing multiple portals into an Rbridge network.

2. Description of the Related Art

Data communication networks may include various routers, switches, bridges, hubs, and other network devices coupled to and configured to pass data to one another. These devices will be referred to herein as "network elements." Data is communicated through the data communication network by passing protocol data units, such as Internet Protocol (IP) packets, Ethernet Frames, data cells, segments, or other logical associations of bits/bytes of data, between the network elements by utilizing one or more communication links between the devices. A particular protocol data unit may be handled by multiple network elements and cross multiple communication links as it travels between its source and its destination over the network.

Network elements known as bridges are used to interconnect multiple physical links. Unless otherwise restricted, a bridge will broadcast traffic received on a particular link onto all other links to which it is attached. Where a group of bridges are interconnected, the links over which a particular bridge is allowed to broadcast traffic must be restricted to prevent loops from being formed in the bridged network. Specifically, if a loop is formed in the bridged network, a particular packet may continue to propagate around the loop, which will cause all network elements on the loop to continually broadcast the same packets. For example, FIG. 1 illustrates an example of a bridged network including bridges 1-8 that are connected by links 10-23. If a packet is received by node 1 from source S1 and is broadcast on the bridged network, node 1 would broadcast the packet on links 10, 11, and 13. Node 3, upon receipt, would broadcast the packet on links 12, 14, 15, & 16, which would cause node 2 to receive two copies of the packet. As the packet progressed further in the network additional copies of the packet would be generated causing further multiplication of the packet on the network.

One conventional way of determining which links should be used to broadcast packets by each bridge in a bridged network is to organize the links using a tree structure. Each of the nodes on the network will calculate where it fits into the tree and which of the available links on the network will be used to broadcast traffic on the network.

FIG. 2 illustrates one example of a type of tree that may be created to prevent loops in a bridged network. In the example shown in FIG. 2, a spanning tree is created to designate links between the nodes that will be used to broadcast traffic on the bridged network. In the illustrated embodiment, the spanning tree includes links 11, 12, 14, 15, 16, 21, and 22, and doesn't include the other links. When a packet is received by node 1 from source S1, it will broadcast the packet only on the links that are part of the spanning tree. Thus, node 1 will broadcast the packet on link 11 to node 3. Node 3 will broadcast the packet on links 12, 14, 15, and 16 (not on the link over which it was received), and the packet will progress through the spanning tree. Thus, using a spanning tree, a packet may be broadcast onto a bridged network and be delivered once to each node without causing packets to loop and the concomitant exponential proliferation of packets that looping may cause.

As shown in FIG. 2, the spanning tree provides a useful construct for allowing packets to be broadcast onto a bridge network. However, use of the spanning tree for unicast traffic may not be efficient, since the spanning tree concentrates all traffic onto a few of the links on the network, and may require traffic to take an indirect path between nodes. For example, assume that node 6 wanted to transmit data to node 4. If the data path were to follow the spanning tree, the data path would include link 21 from node 6 to node 8, link 15 from node 8 to node 3, and link 14 from node 3 to node 4. This three segment path may have a higher cost than the path through link 20 which extends directly between node 6 and node 4. Additionally, concentrating the traffic on the links forming the spanning tree may cause congestion on the links that form part of the spanning tree while allowing the other links to remain underutilized.

To solve this problem, routing bridges (Rbridges) have been developed. Rbridges are network elements that behave like bridges in connection with broadcasting traffic onto a network, but are able to route traffic through the network as well. In an Rbridge network, once a spanning tree has been established, such as in the example shown in FIG. 2, sources S1 and S2 will periodically broadcast a ping/hello message to allow the nodes 1 and 7 to learn about their respective attached sources. When one of the sources would like to communicate with the other source it will send an ARP request onto the network to determine the address of the intended destination. For example as shown in FIG. 3, assume that S1 needs to communicate with S2, and that S1 does not have S2's address. S1 will send an ARP broadcast to node 1, which will forward the ARP broadcast over the spanning tree on the Rbridge network (arrows 1-3) so that the ARP is received by all other nodes on the Rbridge network. As a result, all of the nodes on the network will know that S1 is located on node 1. Node 7 will receive the ARP request and forward the ARP request to S2 (arrow 4).

As shown in FIG. 4, S2 will generate a response to S1 with a unicast ARP response (arrow 5). The ARP response will be received by node 7 and forwarded to node 1, which will forward the ARP response to S1. Since the Rbridge network is able to route traffic, the ARP response may be sent directly to S1 using paths other than those forming the spanning tree. For example, the ARP response could take links 24, 20, and 13 to reach node 1. S1 and S2 may then compute routes to each other to enable point-to-point communications to occur over two unidirectional paths or over a bidirectional path on the network.

Rbridge networks are connected to external networks using portals. For example as shown in FIG. 5, one of the nodes (node 5 in this example) may be used as a portal to interconnect the Rbridge network with an external network. In this situation, a spanning tree may be established within the Rbridge network to handle broadcasts within the Rbridge network and a second spanning tree may be run on the external network outside of the Rbridge network. Traffic between the Rbridge network and the external network will be directed through the portal. Where there is only one portal, such as in the example shown in FIG. 5, the spanning tree within the Rbridge network and the spanning tree in the external network only connect at one point to prevent any possibility that a loop may be formed.

While a single portal Rbridge network architecture works well for relatively small Rbridge networks, as the Rbridge network grows it may be desirable to use multiple portals. Specifically, since the traffic between the Rbridge network and external network must pass through the portal to exit or enter the Rbridge network, the portal may become a bottleneck to the flow of traffic between the networks and also represents a single point of failure on the network.

If multiple portals are to be used on an Rbridge network, it becomes necessary to partition the spanning tree within the Rbridge network. Unfortunately, since a spanning tree will be computed from each portal, it is likely that the spanning trees may overlap, such that a particular node on the Rbridge network may be included on two or more trees which may cause loops to be formed in the network. Although it may be possible to calculate a set of balanced minimum spanning trees rooted at the portals, the computation of such trees is non-trivial. Particularly where the topography of the Rbridge network may change over time, recomputing new trees every time the network changes may be difficult to implement.

SUMMARY OF THE INVENTION

The present invention overcomes these and other drawbacks by providing a method and apparatus for enabling multiple portals to be used on an Rbridge network. According to an embodiment of the invention, shortest-path trees are created outward from each portal on the Rbridge network rather than spanning trees. Since shortest-path trees are relatively easy to compute, new trees may be recomputed upon occurrence of a network change without too much difficulty. For those nodes that are equidistant from multiple portals, and hence could be logically included in more than one tree, an election process occurs by each of the portals and the subject node so that the network elements on the network may determine which trees the nodes will join. By causing the election to occur it is possible to break the Rbridge network into a plurality of non-overlapping trees so that routing loops do not occur even when there is more than one portal into the Rbridge network.

To enable routes associated with nodes on the Rbridge network to be distinguished from routes external to the Rbridge network, messages may be transmitted between the portals. The messages enable portals to identify routing updates received from the external network as containing internal routes, so that routes that are required to pass between nodes on different trees may pass over the Rbridge network rather than over the external network.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

According to an embodiment of the invention, intersecting spanning trees in an Rbridge network may be avoided by creating a shortest-path spanning tree outward from each portal on the Rbridge network, and causing an election to occur for those nodes that are equidistant from multiple portals so that the network elements on the network may determine which trees the nodes will join. By causing the election to occur it is possible to break the Rbridge network into a plurality of non-overlapping trees so that routing loops do not occur even when there is more than one portal into the Rbridge network. Since shortest-path trees are relatively easy to compute, new trees may be recomputed upon occurrence of a network change without too much difficulty. For example, if OSPF is run on the network, then each Rbridge on the network will know the shortest path to a closest portal, and may assign itself to a portal automatically. The link(s) on the shortest path to/from the portal will be included in the broadcast tree rooted at that portal so that looping of packets broadcast on a tree will not occur.

Figure 1:
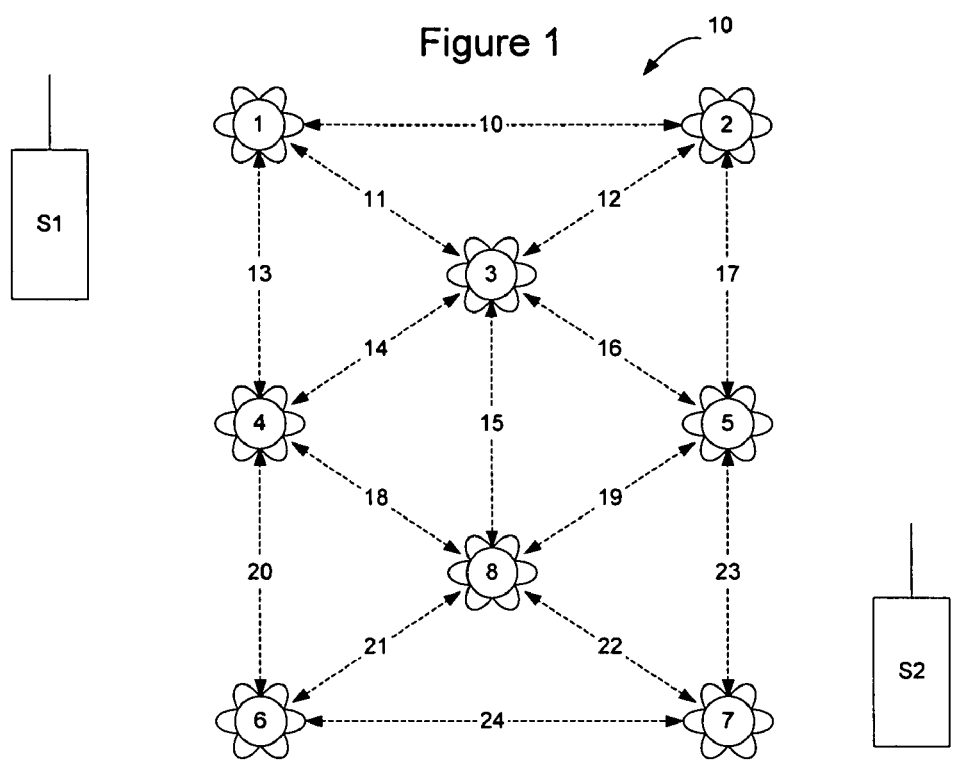
FIG. 1 is a functional block diagram of a portion of an example routing bridge (Rbridge) communication network.
Figure 2:
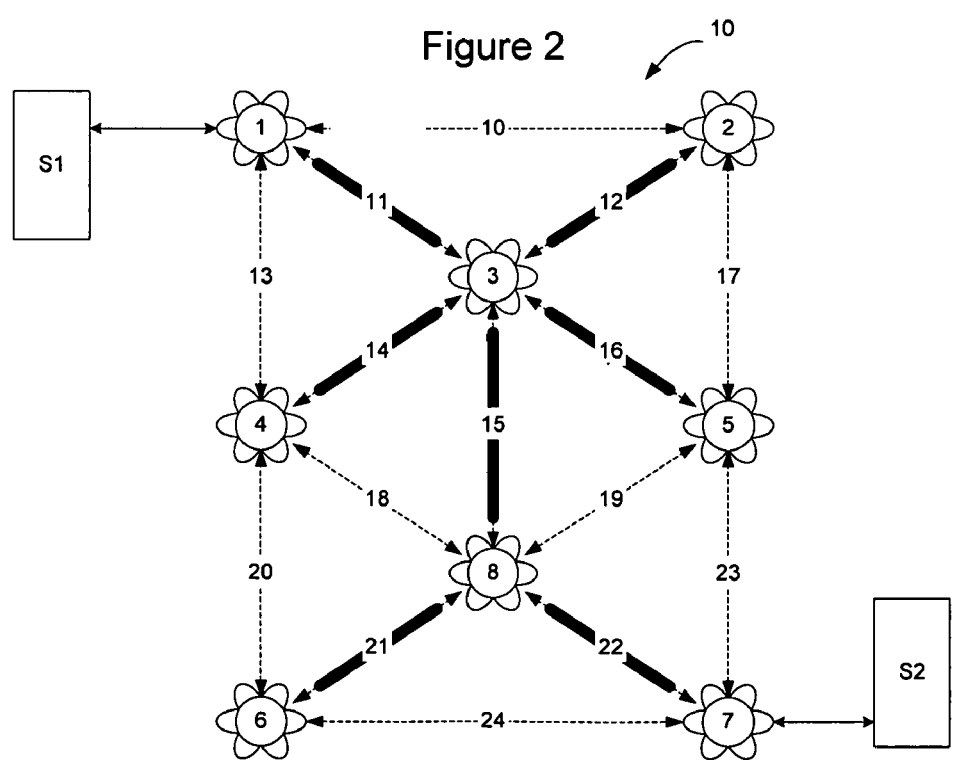
FIG. 2 is a functional block diagram of the portion of the network of FIG. 1 illustrating an example spanning tree computed on the network.
Figure 3:
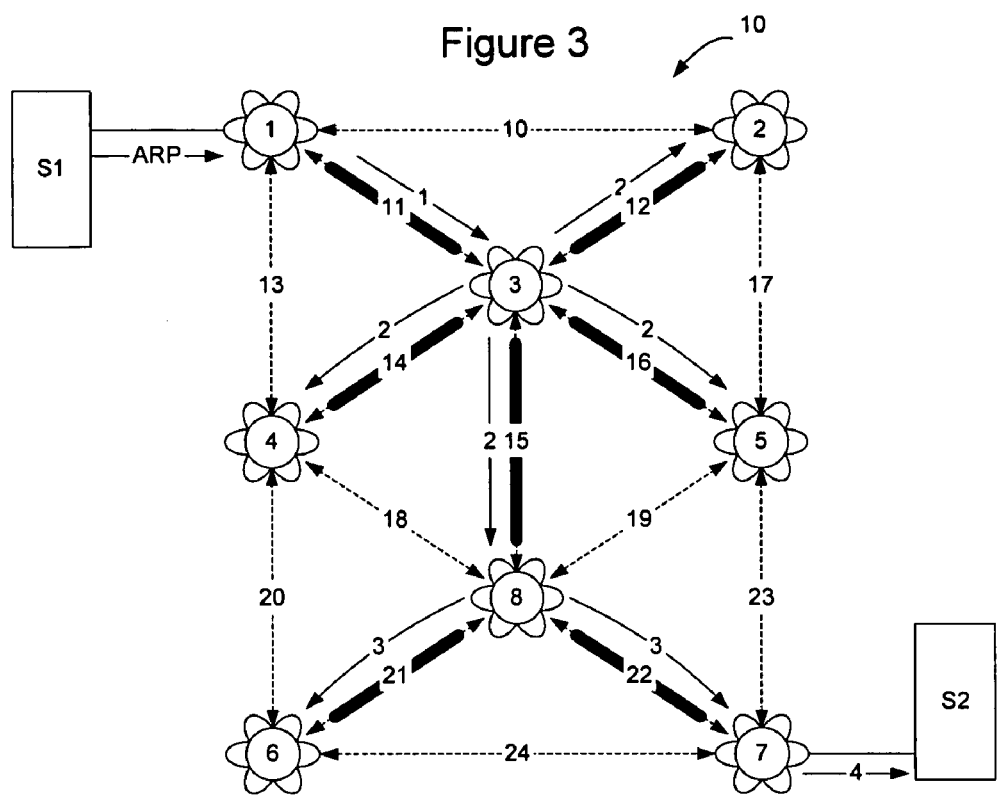
FIG. 3 is a functional block diagram of the portion of the network of FIG. 2 illustrating the flow of broadcast information on the network.
Figure 4:
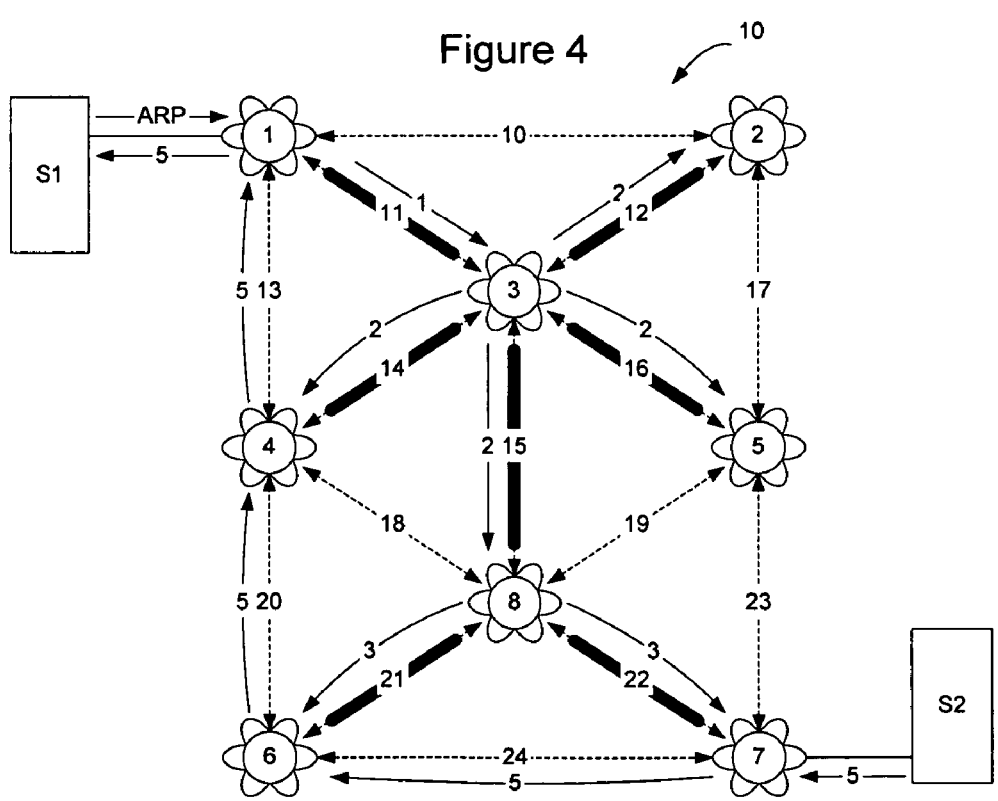
FIG. 4 is a functional block diagram of the portion of the network of FIG. 1 illustrating an example of a routed unicast message on the Rbridge network.
Figure 5:
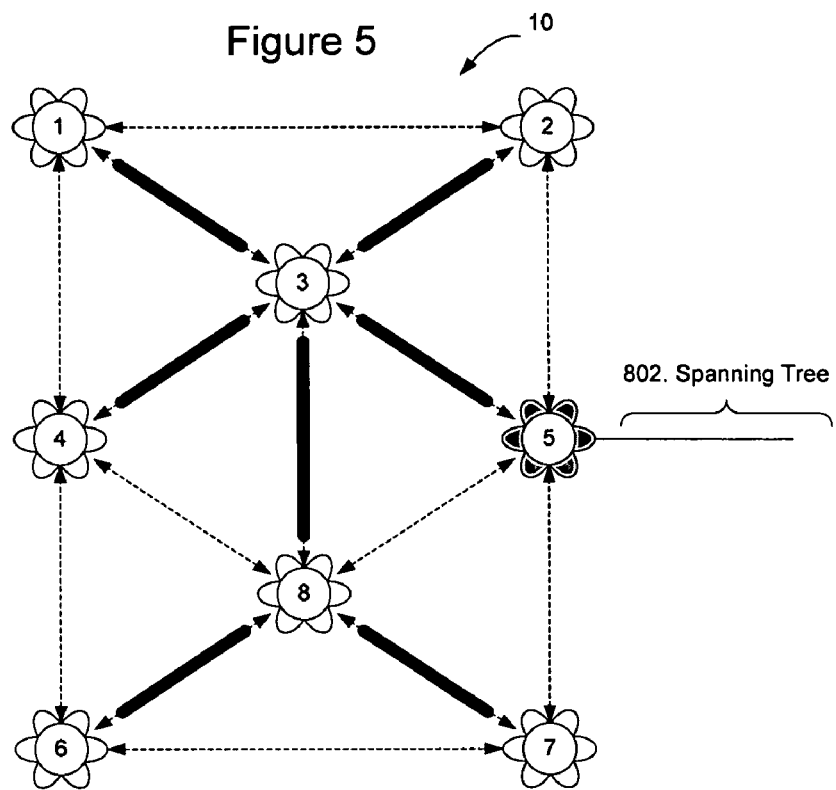
FIG. 5 is a functional block diagram of the portion of the network of FIG. 1 illustrating a portal between the Rbridge network and an external network.
Figure 6:
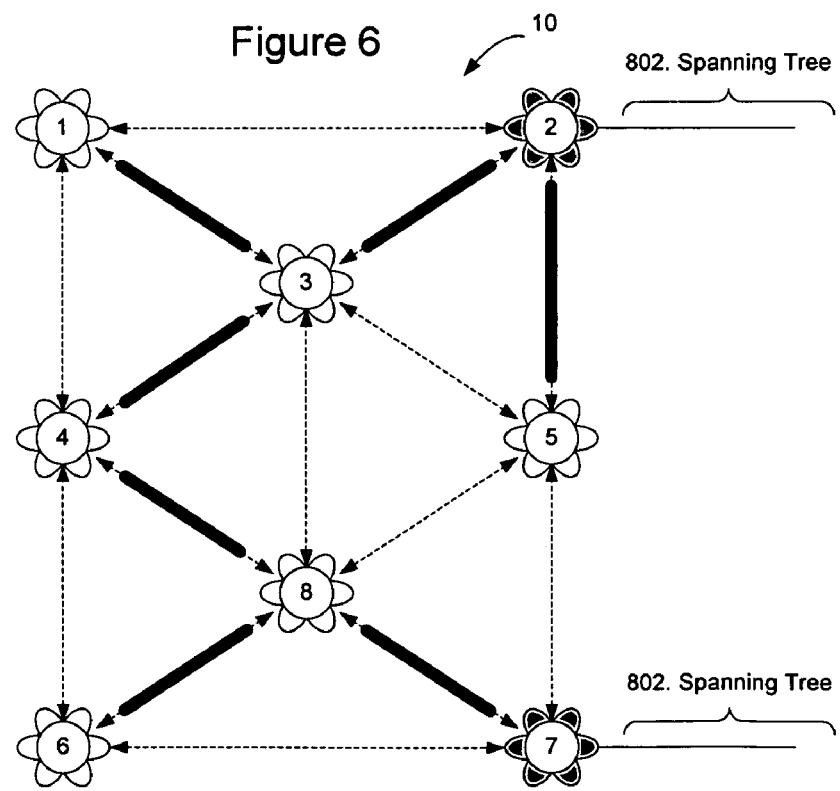
FIG. 6 is a functional block diagram of the portion of the network of FIG. 1 illustrating two portals between the Rbridge network and an external network according to an embodiment of the invention.

Occasionally, where there is more than one portal, a given node may compute a shortest path and determine that it is equidistant to two or more portals. In this instance, a consistent tie-breaking algorithm may be used to assign the node to one of the shortest path trees. An example of this scenario is illustrated in FIG. 6. As shown in FIG. 6, the nodes on the Rbridge network are assigned to trees by causing each node on the network to compute the shortest path to a portal, and then causing the links used by that node to be added to the shortest path tree rooted at the portal. In the Example shown in FIG. 6, however, node 4 may be equidistant from two or more portals (portals 2 and 7 in this example) and an election is required to determine which tree the node should join.

Figure 7:
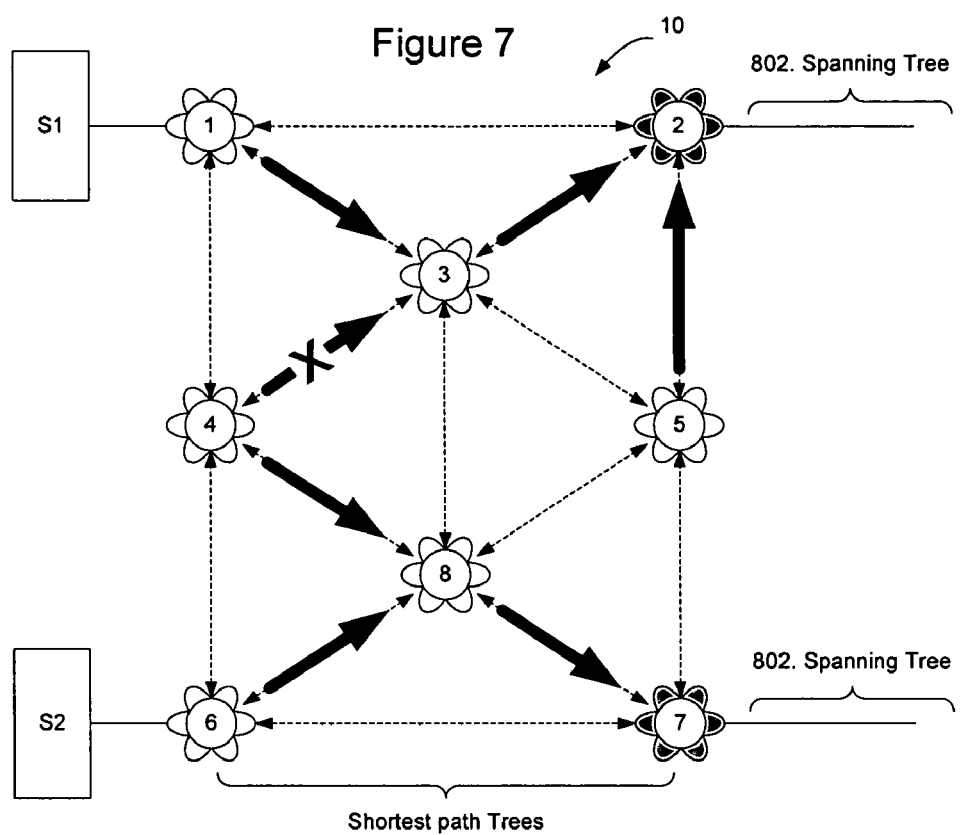
FIG. 7 is a functional block diagram of a portion of an Rbridge network in which shortest path trees are used to define broadcasting trees out of multiple portals.
Figure 8:
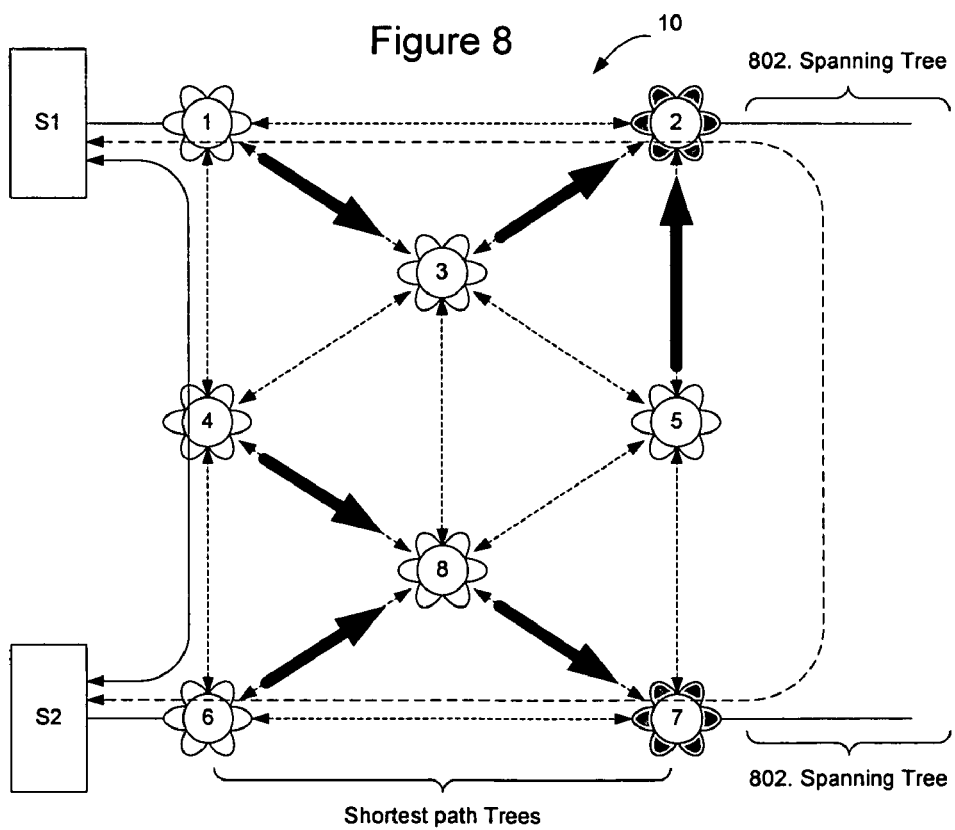
FIG. 8 is a functional block diagram illustrating a proposed path on the Rbridge network between subscribers in different trees.

One example method for electing between multiple portals may be to perform a hash on the node IDs of the equidistant portals and the electing node, Hash (N2, N4, N7), and use the result of the Hash function to determine which tree to join. This election process may be performed by the node and the portals using the same function so that all participants will come to the same result, so that a consistent view of the network may be built in both portals. Other methods may be used as well, and the invention is not limited to this particular method. FIG. 7 illustrates the process of determining which shortest path tree a node (such as node 4) should join, and FIG. 8 shows the result of the election process once the shortest path trees have been established on the Rbridge network.

To ensure that portals and nodes on the network compute the same shortest path trees and node assignments, the links in the tree need to have symmetric link weights. Specifically, each node and portal on the network will use weights assigned to the links to determine the shortest path to get from itself to the other portals/nodes. For example, in FIG. 7, portal 2 will use the link weights to determine a route from itself to node 4, and node 4 will use the link weights to determine a route from itself to portal 2. Since the weights on a link may be different in different directions, if the link weights are not symmetrical, portal 2 might determine that the shortest path from itself to node 4 is through node 1, while node 4 might determine that the shortest path to portal 2 is via node 3. Accordingly, since the nodes and portals are computing shortest paths at the same time, the link weights should be symmetrical for purposes of computing the shortest path trees.

Although the shortest path trees may be established in this manner, traffic on the network is not required to use the shortest path trees except in connection with broadcasting traffic. Accordingly, traffic flowing between the nodes on the network may be unicast directly between the nodes using any appropriate routing mechanism. For example, the traffic may be source routed through the network such that the sending node determines a route from the sending node to the receiving node and includes in the header an indication of the path the traffic should use to get from the sending to the receiving node. Other methods of unicasting traffic may be used as well and the invention is not limited to an embodiment that utilizes source routing to unicast traffic on an Rbridge network.

To enable traffic to be routed, it is necessary for the nodes to exchange routing information so that they are able to determine paths to each other. However, routing information learned on one shortest path tree associated with one of the portals is required to be transmitted over the external network before it is able to be rebroadcast over the other shortest path trees on the Rbridge network.

Figure 9:
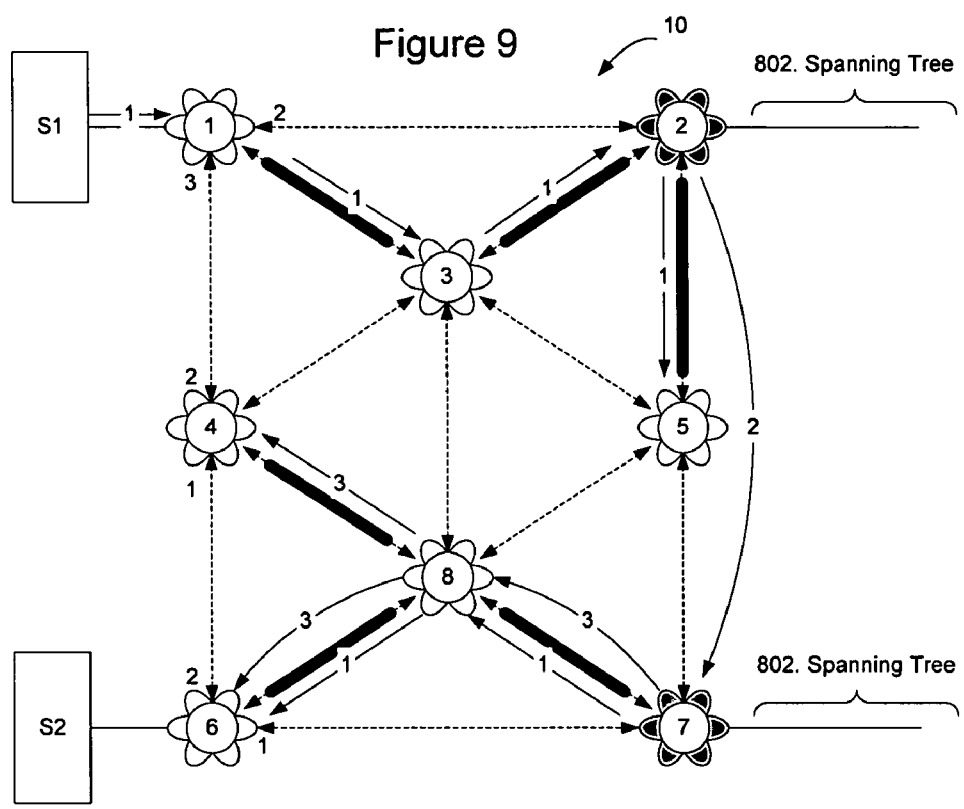
FIG. 9 is a functional block diagram illustrating the flow of routing information according to an embodiment of the invention.

For example, as shown in FIG. 9, assume that S1 transmits an ARP request to node 1. Node 1 will flood the ARP request within the Rbridge network over the shortest path tree rooted at portal 2 so that all nodes on that particular tree know of S1 on node 1. However, the nodes that aren't on that shortest path tree (nodes 6, 7, and 8 in this example) will not receive the flooded ARP request since the spanning tree on the Rbridge network in the illustrated network has been partitioned.

The routing information, such as the ARP request, will be transmitted to the external network and passed over the spanning tree in that network to ultimately be received by the other portals into the Rbridge network. Thus, the rest of the Rbridge network ultimately will receive the routing information. In the example shown in FIG. 9, upon receipt of the ARP request, the portal 2 will transmit the ARP request out onto the external network. The ARP request will propagate through the external network until it reaches portal 7, at which time the ARP request will be broadcast through the Rbridge network to nodes 4, 6, and 8 (arrow 3).

However, routing information that comes into the Rbridge network from outside the Rbridge network will be assumed to relate to an external route. Thus, when the portal 7 receives the routing update, it will assume that the update relates to an external route and will cause the route update broadcast onto the Rbridge network to point to portal 7. Accordingly, all traffic for that route will be directed via the portal to the external network. For example, FIG. 8 shows a desired route between S1 and S2 over the Rbridge network (solid arrow) and the route that would be used if the routing information were disseminated via the external network using conventional routing mechanisms (dashed arrow).

Thus, if an ARP request is received by the portal 7 from the external network, it will be broadcast into the Rbridge network and indicate that the network elements associated with the ARP request are reachable over portal 7. In the example shown in FIG. 9, when the ARP request from S1 is received at portal 7, the portal 7 will not know that S1 is located on the Rbridge network and, therefore, will cause the nodes on the lower tree to install a route for S1 that passes through portal 7. Accordingly, using existing mechanisms, traffic to be sent between trees on the Rbridge network would be required to exit the Rbridge network (e.g. to follow the path represented by the dashed arrow), which may be less efficient than allowing the traffic to pass directly over the Rbridge network.

To enable routes internal to the Rbridge network to be installed as internal rather than external routes, according to an embodiment of the invention, messages are sent between the portals to enable the portals to determine which routes are associated with nodes on the Rbridge network. According to an embodiment of the invention, the portal forming the root of the shortest path tree on which a broadcast routing update was initially received may transmit the routing update (without the user payload) to each of the other portals via a multicast or unicast message. Although an empty routing information message may be used in connection with an embodiment of the invention, the invention is not limited in this manner as other types of messages may be used as well to enable the portals to correlate externally received routing messages with routes internal to the Rbridge network. When the routing update is received from the external network, the empty (or otherwise distinguished) routing update message may be used to identify it as containing routes that relate to nodes on the Rbridge network. The routing update may then be forwarded by the other portals into the Rbridge network over their associated spanning trees so that the routing update is able to be received by all of the nodes on the network. The receiving portal may transmit the routing update in a normal manner with the route pointing at itself, or may modify the message so that the nodes are able to associate the route with the original portal. Alternatively, the portal may use the information associated with the routing update to update its database so that it may forward the routing update or information associated with the routing update when it appears that traffic is being routed inefficiently.

By providing the portals with a message indicating that the routing update originated within the Rbridge network, it is possible to allow the portals to differentiate between routing updates that are associated with the external network and those routing updates that are associated with the Rbridge network, so that the portal is able to determine if it may be possible to optimize routing between particular network elements.

Figure 10:
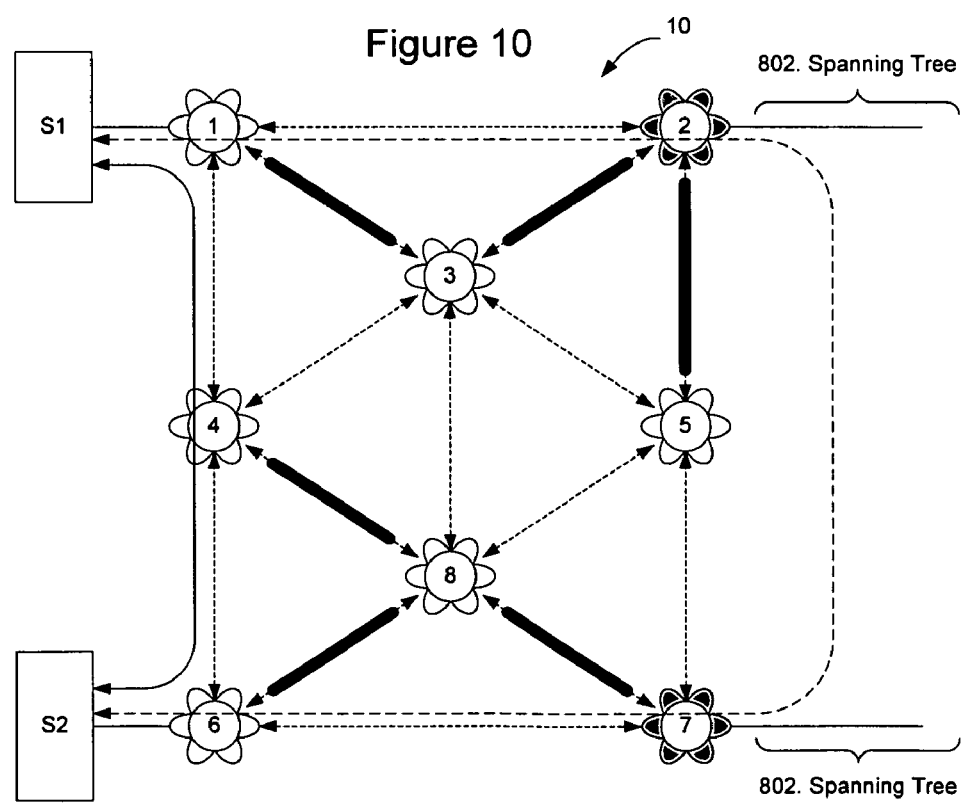
FIG. 10 is a functional block diagram illustrating a datapath that may be established upon exchange of routing information according to an embodiment of the invention.

For example, as shown in FIG. 10, assume that S1 sends an ARP request onto the shortest path tree rooted at portal 2 requesting an address of S2 which is attached to Node 6 that is not part of the same shortest path tree. In this instance, the ARP request (1) will be broadcast to all nodes on the shortest path tree and arrive at portal 2. The message sent by S1 will be assumed for purposes of this example to have the format [S1, node 1, Data].

Portal 2, will broadcast the message (1) from S1 onto the external 802. spanning tree network, so that the message will ultimately be received by each of the other portals. Additionally, Portal 2 will generate a new message (2) by removing the payload data from the original message, to create a new message [S1, node 1, no data], and forward this message (2) to each of the portals which, in this example, includes portal 7. Other messages may be used as well, as mentioned above, and the invention is not limited to an embodiment that uses this particular message format. Portal 7, upon receipt of the second message, will be able to use the second message to identify the message (1) received from the external message as containing routing information for one or more nodes on a different part of the Rbridge network. Also, the portal 7 will know which spanning tree the node is on because the portal 7 will know the identity of the portal 2 that sent the message.

The portal 7 that receives the message may broadcast the new routing information associated with the message over its spanning tree or may use the information to update its database and only advertise the message when it begins to receive traffic being routed outside of the Rbridge network that is addressed to a node that is located inside the Rbridge network. In either instance, the portal is able to use the correlation between the message from the home portal and the routing message received over the network to reduce the need to have traffic flow outside of the Rbridge network. For example, when portal 7 starts to see traffic having a pattern illustrated by the dashed line, it may transmit a routing update onto its spanning tree indicating that S1 may be found on Node N1 which is internal to the Rbridge network. With this information, S2 can compute a shortest path route to S1 and unicast data directly to S1 over the Rbridge network.

The Rbridge network may be a wired network or may be formed from wireless access points distributed in an ad-hoc or planned manner. The invention is not limited by the manner in which the network is implemented.

Figure 11A:
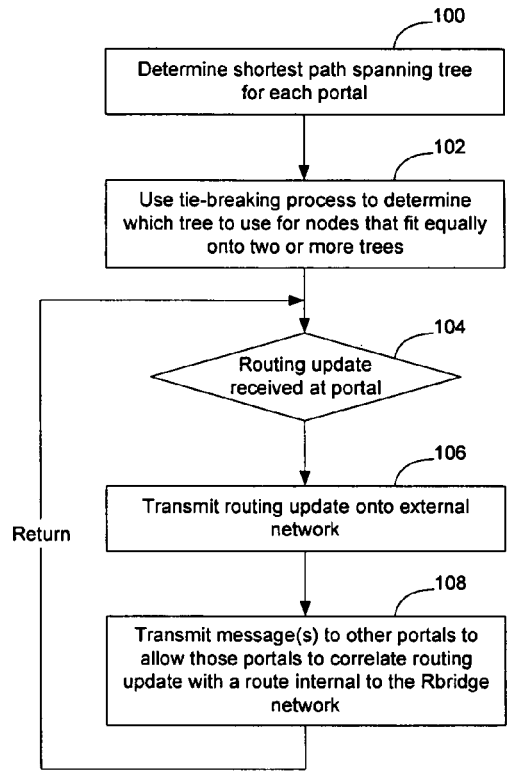
FIGS. 11A and 11B are flow diagrams illustrating a process that may be used to implement an embodiment of the invention.
Figure 11B:
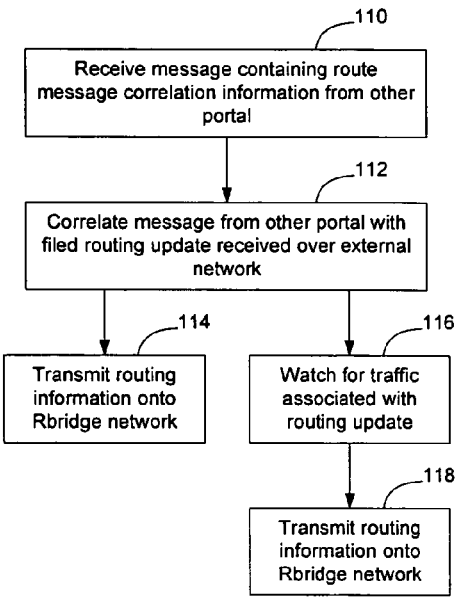

FIGS. 11A and 11B show the flow of information between network elements on the network to enable the portals to correlate externally received routing updates as containing routing information related to nodes on the Rbridge network. As shown in FIG. 11A, nodes will compute a shortest path to a portal and those links used to arrive at the portal will be included in a shortest path spanning tree rooted at the portal (100). Once a set of shortest path trees has been determined, those nodes equidistant to two or more portals will use a tie-breaking process to determine which spanning tree they should join (102).

When a routing update is received at a portal (104), the portal will transmit the routing update onto the external network (106). The portal will also transmit an empty (or otherwise distinguished) routing update to the other portals on the Rbridge network (108). The portal will then return to wait for additional routing updates.

As shown in FIG. 11B, upon receipt of an empty (or otherwise distinguished) routing update from another portal (110), the portal will attempt to correlate the empty (or otherwise distinguished) routing update with a routing update containing payload data received over the external network (112). The portal may then transmit the routing information, including the identity of the home portal or the identity of the node on the Rbridge network to the other nodes by broadcasting that routing information onto the spanning tree rooted at the node (114). Alternatively, the portal may transmit the non-correlated routing update onto the network and watch for traffic addressed to a node on the Rbridge network that is to be transmitted via the external network (116) and broadcast the routing information on the spanning tree rooted at the node only when it becomes necessary for one or more of the nodes on the spanning tree to have that information (118).

Figure 12:
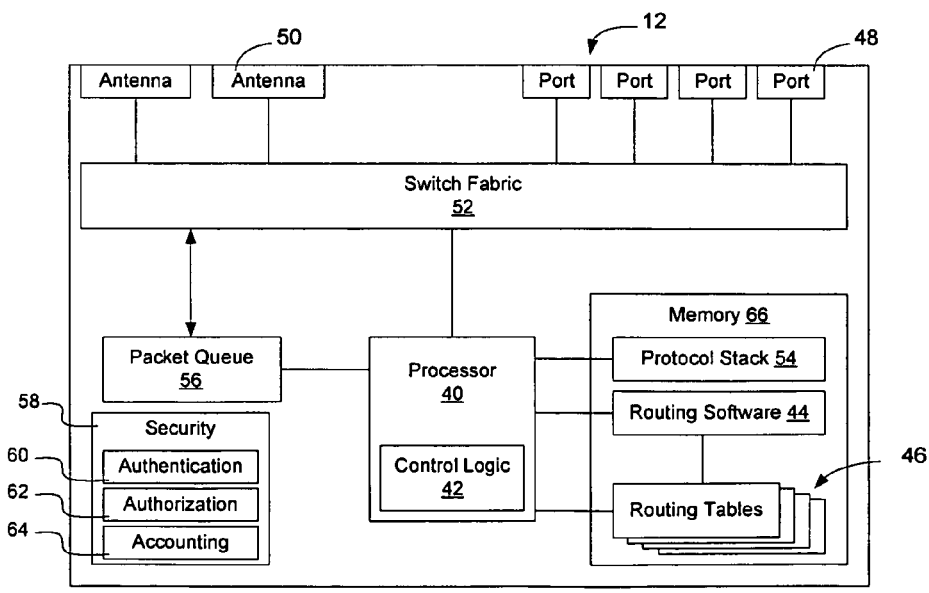
FIG. 12 is a functional block diagram of a portal that may be used to implement an embodiment of the invention.

FIG. 12 is a functional block diagram of a network element configured to implement a portal according to an embodiment of the invention. The invention is not limited to this embodiment as the network element may be implemented in many ways without departing from the scope of the invention.

As shown in FIG. 12, the portal generally includes a processor 40 containing control logic 42 configured to perform functions described herein to enable the portal to operate on the network. The processor may interface routing software 44 and routing tables 46 to enable it to perform the functions described above in connection with FIGS. 1-11.

The network element may be provided with one or more components (hardware and/or software) to enable it to communicate on a communication network. In the embodiment illustrated in FIG. 12, the network element includes a plurality of network ports 48 and antennae 50 to enable the portal to communicate using both wireline and wireless technologies. The invention is not limited to one or more specific types of communication technology.

The various interfaces (wireless and wireline) may be connected to a switch fabric 52 that operates under the control of the processor 40. A protocol stack 54 containing data and instructions configured to enable the portal to participate in protocol exchanges on the network may optionally be included. Other conventional network element features, such as a packet queue 56 configured to temporarily store protocol data units for transmission on the network, may also be included. Additionally, the portal may include a security module 58 containing an authentication module 60 configured to authenticate users, devices, or connections on the network, an authorization module 62 configured to determine appropriate authorization control information to prevent unauthorized access to the network, and an accounting module 64 configured to enable accounting entries to be established for communication sessions on the network. Other modules may be included as well and the invention is not limited to a particular implementation of the network device.

The functions described above may be implemented as a set of program instructions that are stored in a computer readable memory 66 within the network element and executed on one or more processors within the network element. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a

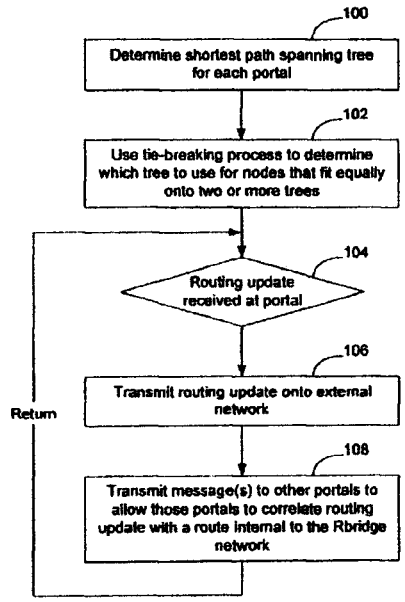

What is claimed is:

1. A method of establishing broadcast trees on a routing bridge (Rbridge) communication network, the method comprising the steps of:
   establishing a plurality of shortest path trees to define broadcast trees on the Rbridge network, each of said shortest path trees being rooted at a portal between the Rbridge network and an external network; and
   for each node that is equidistant to two or more portals, using a tie-breaking process to determine which shortest path tree it should join.

2. The method of claim 1, wherein the tie-breaking process implements a hash function on information associated with the node and each of the two or more portals.

3. The method of claim 1, wherein the shortest path trees are computed by the portals, and wherein the tie-breaking process is performed by the portals.

4. The method of claim 3, wherein the Rbridge communication network comprises a plurality of nodes, and wherein each of the nodes computes a shortest path to at least one portal.

5. The method of claim 4, wherein links between the nodes and portals have symmetric link weights, said symmetric link weights enabling a same shortest path from a node to a portal when computed by either the node or the portal.

6. A method of enabling portals between a routing bridge (Rbridge) network and an external network to correlate routing information received from the external network with nodes internal to the Rbridge network, the method comprising the steps of:
   receiving, by a first portal, a first message containing first routing information over a shortest path tree established on the Rbridge network and rooted at the first portal;
   transmitting, by the first portal, a second message containing the first routing information on the external network; and
   transmitting, by the first portal, a third message to at least a second portal on the Rbridge network, to enable die second portal to correlate the first routing information with at least one of the nodes internal to the Rbridge network.

7. The method of claim 6, wherein the third message has the same format as the first message but doesn't contain the first routing information.

8. The method of claim 6, wherein the third message has information configured to be used by the second portal to identify the second message if the second message is received from the external network.

9. The method of claim 6, wherein the first touting information is associated with a route accessible via a first node in the Rbridge network.

10. The method of claim 6, wherein the shortest path tree is configured to be used to broadcast messages on the Rbridge network.

11. The method of claim 10, wherein the second portal is not on the shortest path tree rooted at the first portal.

12. A method of correlating routing information received by a first portal into a routing bridge (Rbridge) network from an external network with a first node internal to an Rbridge network, the method comprising the steps of:
   receiving, by the first portal, a first message from the external network, said first message containing routing information;
   receiving, by the first portal, a second message from a second portal on the Rbridge network, said second message containing information configured to enable the first portal to correlate the first message with a route through the first node internal to the Rbridge network.

13. The method of claim 12, wherein the first message is a filled routing information message, and wherein the second message is an empty routing information message.

14. The method of claim 12, further comprising the step of correlating the first message with a route through the first node internal to the Rbridge network.

15. The method of claim 12, wherein the first portal is a root of a first shortest path tree interconnecting the first portal with a plurality of nodes on the Rbridge network, and wherein the first node is not associated with the first shortest path tree.

16. The method of claim 15, further comprising the steps of:
   correlating the first message with a route through the first node internal to the Rbridge network; and
   transmitting a third message onto the first shortest path tree, said third message containing an indication of the correlation between the routing information and an identity of the first node internal to the Rbridge network.

17. The method of claim 16, wherein the step of transmitting is performed automatically upon completion of the step of correlating.

18. The method of claim 16, wherein the step of transmitting is performed when a node on the first shortest path tree begins to transmit information associated with the routing information.

19. The method of claim 15, further comprising the step of computing the shortest path tree.

20. The method of claim 12, wherein the step of receiving the second message is performed before the step of receiving the first message.

* * * * *

UNITED STATES PATENT AND TRADEMARK OFFICE
CERTIFICATE OF CORRECTION

PATENT NO.         : 7,450,527 B2                                                   Page 1 of 1
APPLICATION NO.    : 11/281334
DATED              : November 11, 2008
INVENTOR(S)        : Peter Ashwood Smith It is certified that error appears in the above-identified patent and that said Letters Patent is hereby corrected as shown below:

Col. 9-10,
Delete claims 6-20.

Signed and Sealed this
Fifth Day of April, 2011

David J. Kappos
*Director of the United States Patent and Trademark Office*

UNITED STATES PATENT AND TRADEMARK OFFICE
CERTIFICATE OF CORRECTION

PATENT NO. : 7,450,527 B2
APPLICATION NO. : 11/281334
DATED : November 11, 2008
INVENTOR(S) : Peter Ashwood Smith It is certified that error appears in the above-identified patent and that said Letters Patent is hereby corrected as shown below:

Delete the title page and substitute therefore the attached title page showing corrected number of claims in patent.

Col. 9, line 37 - Column 10, line 54,
Delete claims 6-20.

This certificate supersedes the Certificate of Correction issued April 5, 2011.

Signed and Sealed this
Third Day of May, 2011

David J. Kappos
*Director of the United States Patent and Trademark Office*

(12) United States Patent
Ashwood Smith

(10) Patent No.: US 7,450,527 B2
(45) Date of Patent: Nov. 11, 2008

(54) METHOD AND APPARATUS FOR IMPLEMENTING MULTIPLE PORTALS INTO AN RBRIDGE NETWORK

(75) Inventor: Peter Ashwood Smith, Hull (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 588 days.

(21) Appl. No.: 11/281,334

(22) Filed: Nov. 17, 2005

(65) Prior Publication Data

US 2006/0109801 A1 May 25, 2006

Related U.S. Application Data

(60) Provisional application No. 60/630,443, filed on Nov. 23, 2004.

(51) Int. Cl.
*H04L 12/28* (2006.01)
(52) U.S. Cl. .............. 370/255; 370/408; 709/220; 709/241
(58) Field of Classification Search .............. 370/408
See application file for complete search history.

(56) References Cited

U.S. PATENT DOCUMENTS

| | | | | |
|---|---|---|---|---|
| 4,987,536 A | * | 1/1991 | Humblet | 709/241 |
| 5,251,205 A | * | 10/1993 | Callon et al. | 370/392 |
| 5,309,437 A | * | 5/1994 | Perlman et al. | 370/401 |
| 5,570,466 A | * | 10/1996 | Oechsle | 709/238 |
| 6,098,107 A | * | 8/2000 | Narvaez-Guarnieri et al. | 709/239 |
| 6,704,320 B1 | * | 3/2004 | Narvaez et al. | 370/408 |
| 7,398,322 B1 | * | 7/2008 | Perlman | 709/239 |
| 2003/0043756 A1 | | 3/2003 | Reynders et al. | |
| 2005/0068903 A1 | | 3/2005 | Perlman | |

OTHER PUBLICATIONS

R. Perlman, et al., *Rbridges: Transparent Routing.* draft-perlman-rbridge-03.txt, Internet Engineering Task Force (IETF) Internet Draft, May 2005 (18 pages).
R. Perlman, et al., *Rbridges: Transparent Routing.* draft-perlman-rbridge.txt, IETF Internet Draft, Jul. 2004 (20 pages).
R. Perlman, *Rbridges: Transparent Routing,* IEEE INFOCOM 2004 (8 pages).

* cited by examiner

*Primary Examiner*—Wing F Chan
*Assistant Examiner*—Brian Roberts
(74) *Attorney, Agent, or Firm*—Anderson Gorecki & Manaras LLP

(57) ABSTRACT

Shortest-path spanning trees are created outward from each portal on a Rbridge network with nodes on the network being assigned to the spanning trees. For those nodes equidistant to two portals, an election process is used to determine which tree the node should join. To enable routes associated with nodes on the Rbridge network to be distinguished from routes external to the Rbridge network, messages may be transmitted between the portals. The messages enable portals to identify routing updates received from the external network as containing internal routes, so that traffic that is required to pass between nodes on different trees may pass over the Rbridge network rather than over the external network.

5 Claims, 6 Drawing Sheets